(No Model.) 3 Sheets—Sheet 1.
J. M. SPANGLER.
COMBINED HAY RAKE AND TEDDER.
No. 492,341. Patented Feb. 21, 1893.
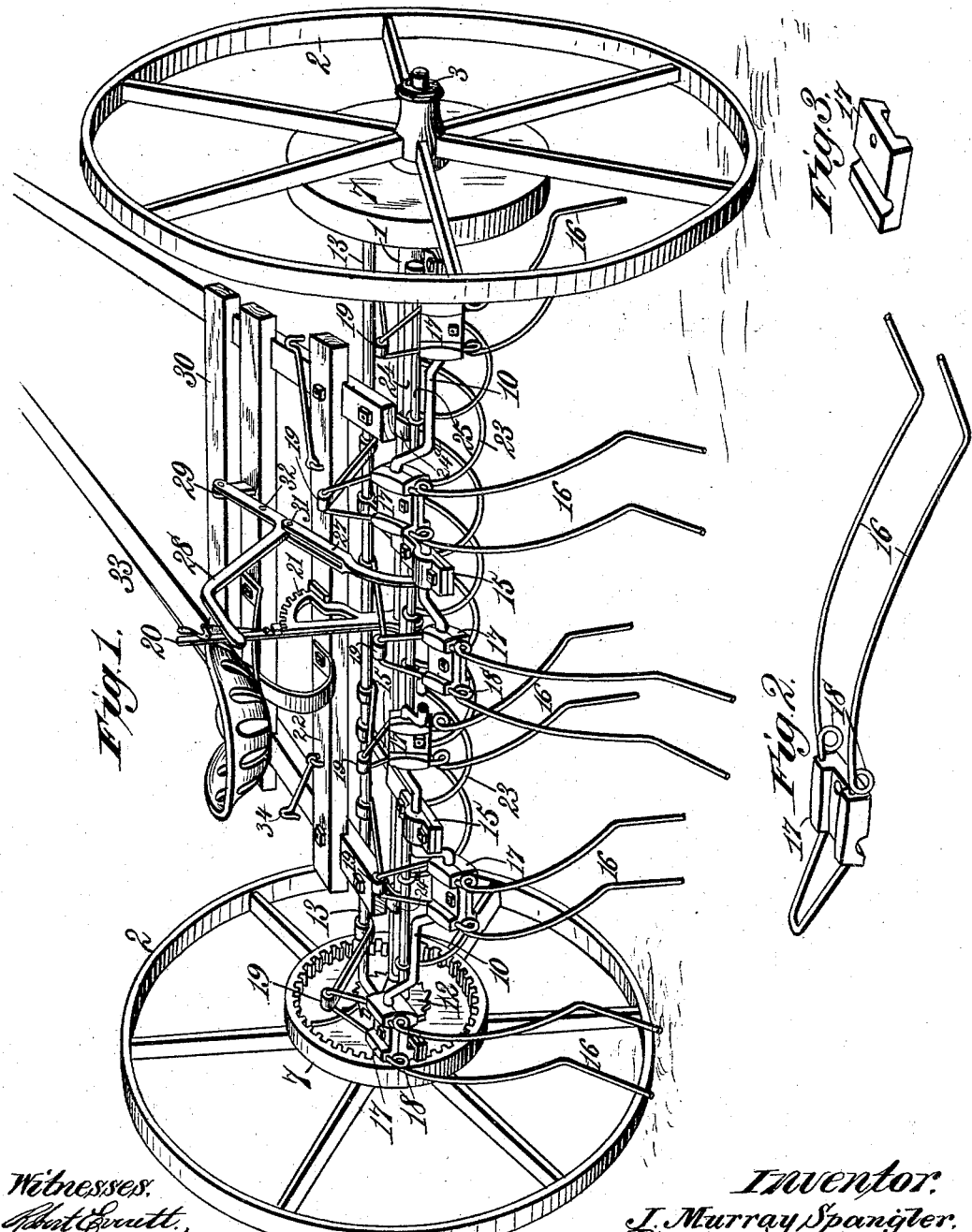
Witnesses.
Robert Pruitt,
J Harry Daly.
Inventor.
J. Murray Spangler.
By H. W. Bond.
Atty.

(No Model.) 3 Sheets—Sheet 2.
J. M. SPANGLER.
COMBINED HAY RAKE AND TEDDER.
No. 492,341. Patented Feb. 21, 1893.
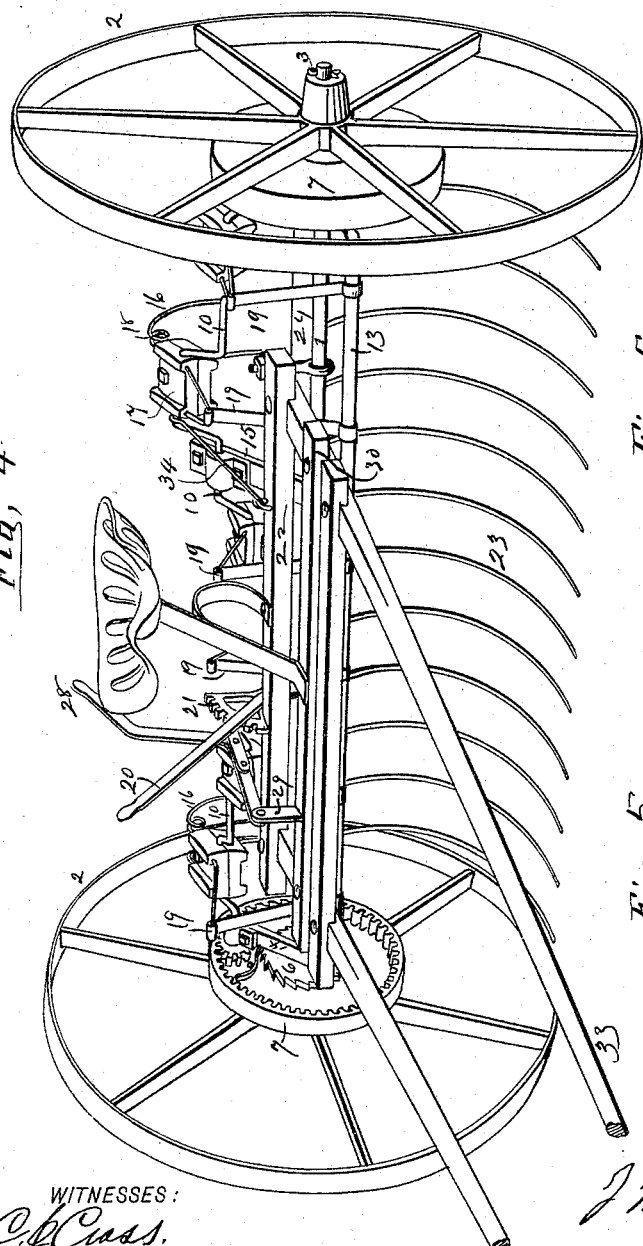
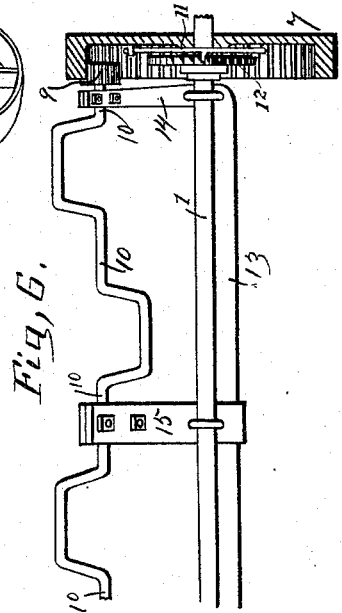
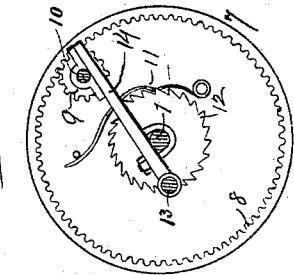
WITNESSES:
INVENTOR
ATTORNEY.

(No Model.)  3 Sheets—Sheet 3.
J. M. SPANGLER.
COMBINED HAY RAKE AND TEDDER.

No. 492,341.  Patented Feb. 21, 1893.

Witnesses,
Robert Everett,
J. Harry Daly.

Inventor:
J. Murray Spangler.
By Fred W Bond
Atty.

UNITED STATES PATENT OFFICE.

JAMES MURRAY SPANGLER, OF CANTON, OHIO.

COMBINED HAY RAKE AND TEDDER.

SPECIFICATION forming part of Letters Patent No. 492,311, dated February 21, 1893.

Application filed March 10, 1892. Serial No. 424,473. (No model.)

*To all whom it may concern:*

Be it known that I, JAMES MURRAY SPANGLER, a citizen of the United States, residing at Canton, in the county of Stark and State of Ohio, have invented certain new and useful Improvements in a Combined Hay Rake and Tedder; and I do hereby declare that the following is a full, clear, and exact description of the same, reference being had to the annexed drawings, making a part of this specification, and to the figures of reference marked thereon, in which—

Figure 7:
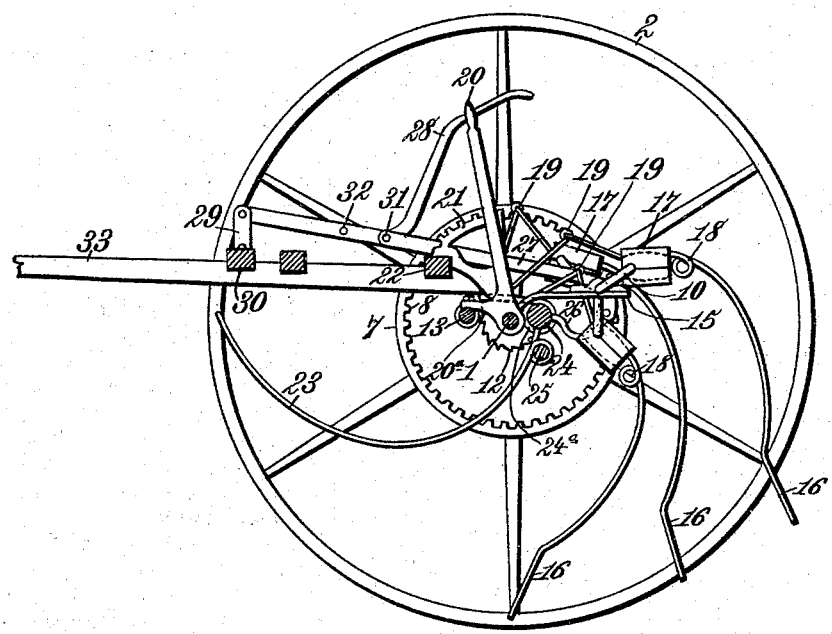
Figure 8:
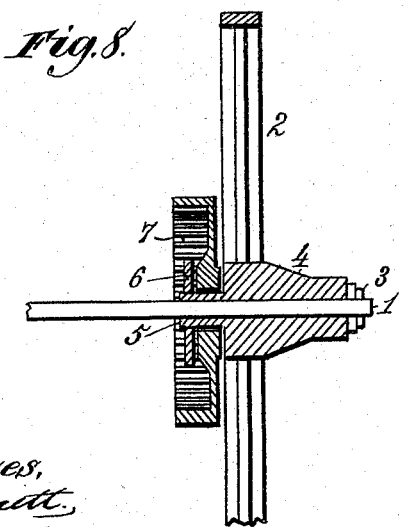

Figure 1. is a perspective view showing the rake folded, and the tedder forks in proper position for action. Fig. 2, is a detached view of one of the tedder forks, showing the same attached to its cap or returning block. Fig. 3, is a detached view of one of the tedder fork caps or blocks. Fig. 4, is a perspective view showing the rake in an operative position, and illustrating the tedder forks elevated so as to bring them out of contact with the hay. Fig. 5, is a side view of one of the tedder shaft propelling wheels and illustrating one of the ratchets and its detent. Fig. 6, is a sectional view of one of the tedder shaft propelling wheels, also illustrating the location of the tedder shaft with reference to its propelling wheel. Fig. 7, is a sectional view showing the tedder shafts, the tedders and operating mechanism, the rake teeth being shown out of operative position. Fig. 8, is a view showing a portion of the axle illustrating one of the traveling wheels, and its hub, mounted thereon, showing the same in section and illustrating the tedder shaft propelling wheel in section, together with the ratchet wheel.

The present invention has relation to a combined hay rake and tedder; and it consists in the different parts and combinations of parts hereinafter described and particularly pointed out in the claims.

Similar numbers of reference, refer to corresponding parts in all the figures of the drawings.

In the accompanying drawings, 1, refers to the axle, which may be of any desired length, reference being had to the width of the rake or tedder designed to be constructed. The traveling wheels 2, are loosely mounted upon the axle 1, and are held in proper position by means of the cotters 3, or their equivalents.

The inner ends of the hubs 4, are provided with the extensions 5, upon which extensions are mounted the ratchet wheels 6, which ratchet wheels are attached to the extensions 5, in any convenient and well known manner. Upon the extensions 5, are loosely mounted the tedder shaft propelling wheels 7, which propelling wheels are located substantially as shown in the drawings, and as shown, they are provided with the inwardly projecting teeth or cogs 8, which teeth or cogs are for the purpose of communicating rotary motion to the pinions 9, said pinions being securely attached to the tedder shafts 10. When it is desired to communicate rotary motion to the tedder shafts 10, the detents 11, are brought into contact with the periphery of the ratchet wheels 12, thereby causing the propelling wheel 7, to revolve with the ratchet wheel 6, and the traveling wheel 2. When it is desired to throw the tedder shafts 10, out of gear, the detents 11, are disengaged from the ratchet wheel 6, thereby permitting the traveling wheels 2, to revolve independent of the propelling wheels 7.

To the axle 1, is attached the bar 13, which bar is provided with the rearwardly extending arms 14, to which arms the outer ends of the tedder shafts 10, are journaled; the inner ends of the tedder shafts being journaled to the arms 15, which arms are securely attached at their front or forward ends to the bar 13, and are pivotally connected to the axle 1.

The tedder forks 16, are formed of a single piece of wire and are preferably made of spring steel, these forks are securely held in proper position upon the shafts 10, by means of the clamps 17, which clamps are properly journaled to the shafts 10. For the purpose of providing a better spring tooth, they are provided with the curl or loop 18, which loop is preferably located just in the rear of the clamps 17; but it will be understood that the curls may be located at any other desired point without departing from the nature of my invention. The tedder forks extend forward a short distance beyond the clamps 17, and to the top or upper ends of the forks 16, are attached the links 19, which bars extend forward, and are pivotally connected to the bar 13.

The object and purpose of providing the links 19 and pivotally connecting them to the top or upper ends of the forks 16, and to the bar 13, is to impart a reciprocating or kicking motion to the tedder forks 16, as the shafts 10, revolve.

When it is desired to use the device as a tedder only, the rake proper is folded under the axle 1, as hereinafter described; and the tedder forks 16, and the shafts 10, are brought into the position illustrated in said Fig. 1, thereby bringing the tedder forks into an operative position, and elevating the rake-teeth so as to bring them out of contact with the hay. The bar 13, is so attached to the axle 1, that it can oscillate upon the axle 1. The object and purpose of so attaching the bar 13, is to provide a means for elevating the shafts 10, together with the forks 16, when it is desired to use the device as a rake. To the axle 1, is securely attached the lever 20, which lever is provided with an ordinary catch, which catch may be constructed and attached to the lever 20, in any convenient and well known manner, and is so located that it will engage the teeth located upon the segment 21. To the axle 1, are pivotally attached the arms 15. It will be understood, that as the top or upper end of the lever 20, is pressed or forced forward by the hand of the operator, the axle 1, will be rotated which in turn elevates the rear ends of the arms 15; carrying with them the shafts 10, together with the forks 16, and their different attachments; and when the tedder forks 16, together with the shafts 10, have been elevated, so as to clear them or bring them out of contact with the hay, the lever 20, is locked to the segment 21, by the means of an ordinary catch. The segment 21, may be securely attached to the cross bar 22, or its equivalent, in any convenient and well known manner. After the tedder forks 16, together with their different attachments have been properly elevated, the pinions 9, are thrown out of gear, together with the wheel 7, by disengaging the detent 11, from the ratchet-wheel 12, thereby permitting the traveling wheel 2, to revolve independent of the propelling wheel 7.

When it is desired to use the device as a rake only, the rake teeth 23, are brought into the position illustrated in Figs. 4 and 9, at which time they will come in contact with the hay designed to be raked. The rake teeth 23, are securely attached to the bar 24, which bar is supported in brackets 24$^a$ extending from the rear end of the thills 33, as shown in Figs. 1 and 7, of such a length that it will correspond with the width of the rake. For the purpose of holding the teeth rigid laterally the rod 25, is provided, which rod is located substantially as shown in Fig. 7, and the teeth 23, are wrapped or wound around said rod. For the purpose of rocking or oscillating the rod 25, the arm 26, is securely attached to said rod, and extends rearward and upward substantially as illustrated in Fig. 7; its top or upper end being pivotally attached to the rear end of the link 27; and for the purpose of operating the rod 25, the lever or handle 28, is pivotally attached to the front or forward end of the link 27; said lever or handle being bent or curved, substantially as illustrated in Fig. 7, and its front or forward end pivotally attached to the post 29, which post is securely attached to the cross bar 30, or its equivalent.

In use, when it is desired to elevate the rake teeth 23, so as to clear said teeth from the windrow, and permit the teeth to pass over the top of the windrow, the lever 28, is pulled forward, which movement carries with it the link 27, thereby bringing forward the top or upper end of the arm 26, which in turn rocks the rod 25, and elevates the teeth 23. After the teeth are passed over the windrow, the lever 28, is brought back, which movement brings the teeth in an operative position and at the same time locks the teeth by throwing the lever 28, past the center, or slightly below the pivotal points of the lever 28, and the link 27. When it is desired to fold the rake teeth under the axle 1, the clamping bolt is removed from the hole 32 in the lever 28 thereby disengaging the link 27, from the lever 28, at which time the link 27, is free to be pushed or forced rearward, which movement rocks the rod 25, sufficiently to throw the teeth 23, under the axle 1, after which the clamping bolt is placed through the aperture 31, and secured.

It will be understood that by my peculiar arrangement, I am able to provide a combined hay rake and tedder in one machine, thereby reducing the cost; when it is taken into consideration that two machines must be constructed, one a hay rake, proper, and a hay tedder proper.

For the purpose of causing the bar 13, to be depressed by the forward movement of the lever 20, its bottom or lower portion is provided with the arm 20$^a$, which arm is securely attached to the bar 13.

It will be understood that the thills 33, are to be constructed in the ordinary manner, and are provided with the ordinary cross-bars to hold them in proper position, and their rear ends are attached to the axle 1, and to the rod or rake head 25, in the ordinary manner.

For the purpose of preventing the shafts 10, from rotating when the same are elevated so as to clear the forks 16, the hooks 34, are provided, which hooks are pivotally attached to the bar 22, and are formed of such a length that their hooked ends will engage the shafts 10. It will be understood that the shafts 10, are provided with the ordinary reverse cranks to give the proper motion to the tedder forks 16.

Having fully described my invention, what I claim as new, and desire to secure by Letters Patent, is—

1. The combination with an axle and traveling wheels loosely mounted thereon, of a hub 4 having an extension 5, a ratchet wheel mounted on the end of said extension, a propelling wheel 7, loosely mounted on the extension 5, detents 11, engaging the said ratchet wheel, a tedder shaft 10, and a pinion 9, secured to said tedder shaft and engaging the propelling wheel 7, substantially as described.

2. The combination with an axle and traveling wheels loosely mounted thereon, of a hub 4, having an extension 5, a ratchet wheel mounted on the end of said extension, a propelling wheel 7 having internal teeth loosely mounted on the extension 5, between the driving wheels and the ratchet wheel, detents 11, secured to the propelling wheel 7, and engaging the ratchet wheel, a tedder shaft 10, and a pinion 9, secured to said tedder shaft and engaging the propelling wheel 7, substantially as described.

3. The combination with an axle provided with traveling wheels, a hub 4 having an extension 5, a ratchet wheel mounted on the end of said extension, a propelling wheel 7, loosely mounted on the extension 5, detents 11 engaging said ratchet wheel, of a tedder shaft 10, a pinion 9 secured to said tedder shaft and engaging the propelling wheel 7, clamps 17, journaled on said tedder shaft, tedder forks passing through said clamps, a bar 13 attached to the axle, and links pivotally connected at one end with the bar 13 and at the other end with the rear ends of the forks 16, substantially as described.

4. In a combined hay rake and tedder, the combination of the axle 1, having loosely mounted thereon the traveling wheels 2, the hubs 4, provided with the extensions 5, the ratchet wheel 7, fixed to the extension 5, the pinions 9, fixed to the shafts 10, the detents 11, the rod 24, having fixed thereto the rake teeth 23, the tedder forks 16, the clamps 17, links 19 journaled to the tedder shaft 10, and the operating levers 20, and 28, substantially as and for the purpose specified.

In testimony that I claim the above I have hereunto subscribed my name in the presence of two witnesses.

J. MURRAY SPANGLER.

Witnesses:
JAMES STERLING,
F. W. BOND.